Figure 1:
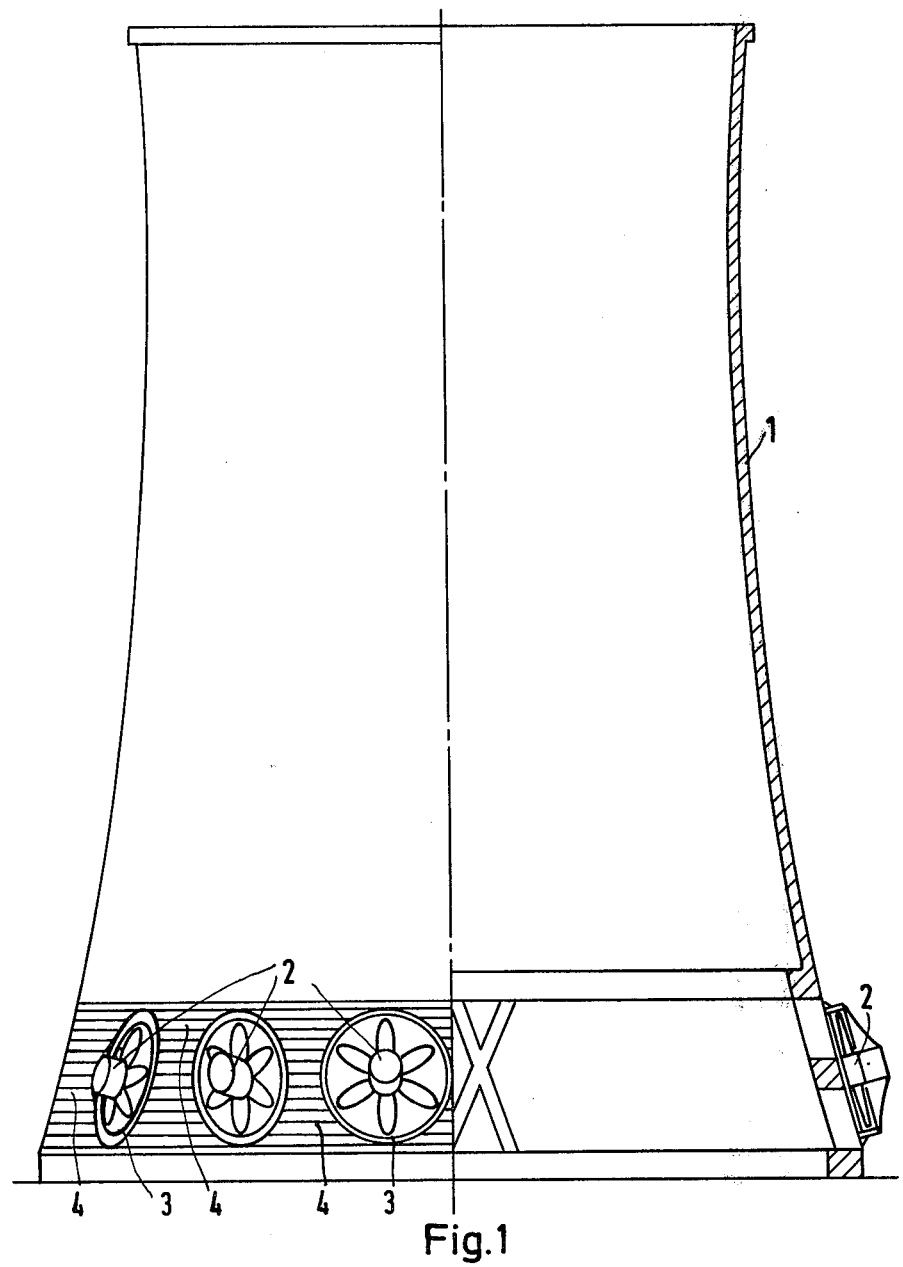

United States Patent [19]

Kelp

[11] 4,164,256

[45] Aug. 14, 1979

[54] COOLING TOWER WITH FORCED VENTILATION AND NATURAL DRAFT

[75] Inventor: Fritz Kelp, Erlangen, Fed. Rep. of Germany

[73] Assignee: Kraftwerk Union Aktiengesellschaft, Mulheim, Fed. Rep. of Germany

[21] Appl. No.: 824,099

[22] Filed: Aug. 12, 1977

[30] Foreign Application Priority Data

Aug. 16, 1976 [DE] Fed. Rep. of Germany ....... 2636807

[51] Int. Cl.$^2$ ............................ F28F 9/24; F28B 9/00
[52] U.S. Cl. ................................ 165/125; 165/137;
165/DIG. 1; 261/109; 261/DIG. 11
[58] Field of Search ................... 165/DIG. 1, 98, 125,
165/129, 137, 123; 261/DIG. 11, 109

[56] References Cited

U.S. PATENT DOCUMENTS

| | | | |
|---|---|---|---|
| 2,863,978 | 12/1958 | Young | 165/129 |
| 3,437,319 | 4/1969 | Engalitcheff, Jr. et al. | 261/DIG. 11 |
| 3,498,590 | 3/1970 | Furlong | 261/DIG. 11 |
| 3,776,306 | 12/1973 | Michel | 261/DIG. 11 |
| 3,903,212 | 9/1975 | Lefevre | 261/DIG. 11 |
| 3,987,845 | 10/1976 | Potthoff et al. | 165/DIG. 1 |

*Primary Examiner*—Sheldon Jay Richter
*Attorney, Agent, or Firm*—Herbert L. Lerner

[57] ABSTRACT

Cooling tower having an outer peripheral wall provided with blowers spaced about the periphery thereof at a lower region thereof, the blowers being formed with annular inlet openings for cooling air, the cooling tower further including means defining closable openings disposed between the annular inlet openings.

3 Claims, 2 Drawing Figures

COOLING TOWER WITH FORCED VENTILATION AND NATURAL DRAFT

The invention relates to a cooling tower wherein cooling air is delivered through forceful blowers or fans disposed at a lower part of the outer wall of the cooling tower. Such cooling towers have become known heretofore, for example, from the periodical Electrical World, March 1968, pages 20, 21 and 74. These cooling towers operating with forced ventilation can have a lower structural height than cooling towers operating with natural draft and having the same output or performance as those with forced ventilation because, in the latter, cooling air is forced by the blowers or fans into the interior of the cooling tower at a greater velocity than that economically possible with cooling air delivery by natural draft.

If the blowers or fans of such a cooling tower were shut down, the cooling output or performance would drop to a very low value because of the minimal amount of cooling air that would be flowing. The operation of the blowers or fans demands, in turn, the consumption of electrical energy for its own power requirement which is not insignificant.

It is accordingly an object of the invention to provide a cooling tower according to the invention which is operatable both with natural draft as well as with forced ventilation without any marked reduction in the cooling output or production when the blowers or fans are shut down.

With the foregoing and other objects in view, there is provided, in accordance with the invention, a cooling tower having an outer peripheral wall provided with blowers spaced about the periphery thereof at a lower region thereof, the blowers being formed with annular inlet openings for cooling air, the cooling tower further comprising means defining closable openings disposed between the annular inlet openings.

In accordance with another feature of the invention, a multiplicity of horizontally extending slats are disposed in the closable openings and are pivotable about respective horizontal axes for closing the closable openings.

In accordance with a further feature of the invention, the slats are mounted on the pivot axes so as to be freely pivotable thereon, the slats being normally in closed position and being openable by inflowing cooling air and thereby acting as check valves.

With the aid of these closable openings, it is possible, under suitable meteorological conditions and for appropriate demands for cooling power or performance, to operate the cooling tower with natural draft when the blowers or fans are shut down. In such a case, an adequate quantity of cooling air flows both through the space of the annular opening in the blowers or fans as well as through the closable openings. In this regard, it is advantageous to provide the closable openings with a cross section which corresponds at least to that which is defined or limited by the ring of the fan or blower. Due to such an increase in the in-flow cross section for the cooling air at the lower edge of the cooling tower, the velocity of the in-flowing cooling air is thereby considerably reduced with respect to the velocity of the in-flowing air during operation of the blowers or fans so that lower resistances occur.

In accordance with a concomitant feature of the invention, deflecting inserts are mounted within the cooling tower wall between the annular inlet openings and the means defining the closable openings, the deflecting inserts projecting into the interior of the cooling tower for guiding the flows of cooling air through the annular openings and through the closable openings independently of one another for a given distance into the cooling tower whereby the flow of cooling air through the annular openings is prevented from mixing with the flow of cooling air through the closable openings directly behind the closable openings. In the foregoing construction, the blowers operate slowly and the closable openings are not closed. The deflecting inserts prevent the cooling air delivered through the blowers from flowing out of the closable openings into the surroundings yet reinforces the draft effect in the cooling tower.

It is thereby possible, upon the occurrence of a return flow of the cooling air at the non-closed closable openings, either to reduce the rotary speed of the blowers or to close the closable openings and increase the rotary speed of the blowers so that the required cooling output or performance is attained. Conventional devices for carrying out such operations automatically can be used.

Cooling towers according to the invention can be of the wet or the dry types of cooling towers or combinations thereof.

Other features which are considered as characteristic for the invention are set forth in the appended claims.

Although the invention is illustrated and described herein as embodied in a cooling tower with forced ventilation and natural draft, it is nevertheless not intended to be limited to the details shown, since various modifications and structural changes may be made therein without departing from the spirit of the invention and within the scope and range of equivalents of the claims.

Figure 2:
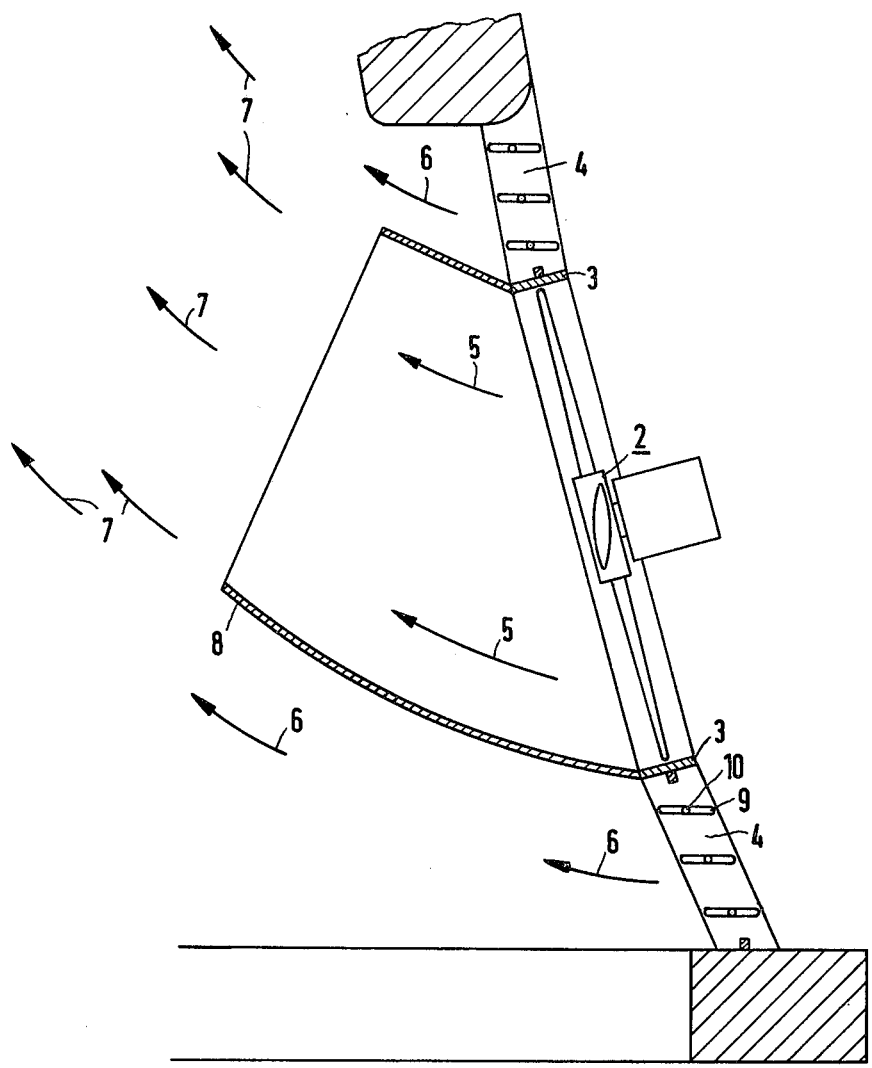

The construction and method of operation of the invention, however, together with additional objects and advantages thereof will be best understood from the following description of specific embodiments when read in connection with the accompanying drawings, in which:

FIG. 1 is a diagrammatic elevational view, partly in section, of a cooling tower with forced ventilation and natural draft constructed in accordance with the invention; and FIG. 2 is a fragmentary enlarged and modified sectional view of the lower right-hand side of the cooling tower shown in FIG. 1.

In the figures, like parts are identified by the same reference numeral.

Referring now to the drawing and first, particularly, to FIG. 1 thereof, there is shown a cooling tower having an outer wall 1, in a lower region of which several blowers or fans 2 are mounted, the blades thereof revolving within annular air inlet openings 3. In the same region of the cooling tower, closable openings 4 are formed between the annular inlet openings 3. To close the openings 4, there are provided, as shown in FIG. 2, a multiplicity of slats 9, disposed in horizontal alignment with one another as well as above one another, the slats 9 being pivotable about respective horizontal axes or pivot shafts 10 secured by any suitable means to the cooling-tower wall.

FIG. 2 further shows how cooling air flows into the cooling tower in direction of the arrows 5, through the spaces intermediate the blades of the fans or blowers 2 and within the inlet openings 3, while additional cooling air flows simultaneously in direction of the arrows 6 through the closable openings 4 into the interior of the cooling tower. Both cooling air flows represented by the arrows 5 and 6 in FIG. 2 are separated from one another by deflecting inserts or partitions 8 up to a location at which both air flows 5 and 6 finally unite and continue to flow together in direction of the arrows 7.

To open and close the slats 9, the horizontal pivot shafts 10 thereof are suitably driven. This drive can be dispensed with or omitted if the horizontal pivot shafts 10 are offset outwardly relative to the slats 9. The slats 9 then act as flaps which keep the openings 4 closed due to force of gravity until they are opened by in-flowing cooling air. By means of suitably disposed stops or any conventional means for limiting the pivoting movement of the thus flap-like slats 9 about the pivots 10 thereof, the slats 9 may be prevented from swinging outwardly and thereby permit air to flow out from the inside of the cooling tower.

There are claimed:

1. Cooling tower for cooling by concurrent cooling with both natural draft and blower draft, by cooling solely with natural draft or by cooling solely with blower draft,
   (a) having an outer peripheral wall provided with blowers spaced about the periphery thereof at a lower region thereof,
   (b) the blowers being formed with annular inlet openings for cooling air,
   (c) the cooling tower further comprising means defining closable openings for cooling with natural draft disposed between the annular inlet openings,
   (d) the closable openings shaped to surround the annular inlet openings and to form the peripheral wall of the cooling tower as a peripheral ring in the region of the annular inlet openings, and
   (e) deflecting inserts mounted within the cooling tower wall between the annular inlet openings and said means defining said closable openings, said deflecting inserts projecting into the interior of the cooling tower for guiding the flows of coolant air through the annular openings and through said closable openings independently of one another for a given distance into the cooling tower whereby the flow of cooling air through the annular openings is prevented from mixing with the flow of cooling air through said closable openings directly behind said closable openings, thereby permitting concurrent cooling with blower draft air flowing through the annular inlet openings and with natural draft air flowing through the closable openings.

2. Cooling tower according to claim 1 including a multiplicity of horizontally extending slats disposed in said closable openings and pivotable about respective horizontal axes for closing said closable openings.

3. Cooling tower according to claim 2 wherein said slats are mounted on said pivot axes so as to be freely pivotable thereon, said slats being normally in closed position and being openable by inflowing cooling air and thereby acting as check valves.

* * * * *